US010393084B2

(12) United States Patent
Nakashima

(10) Patent No.: US 10,393,084 B2
(45) Date of Patent: Aug. 27, 2019

(54) ENGINE AUTOMATIC-STOP/RESTART SYSTEM AND ENGINE AUTOMATIC-STOP/RESTART METHOD

(71) Applicant: Mitsubishi Electric Corporation, Tokyo (JP)

(72) Inventor: Masami Nakashima, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1027 days.

(21) Appl. No.: 14/649,976

(22) PCT Filed: Apr. 4, 2013

(86) PCT No.: PCT/JP2013/060338

§ 371 (c)(1),
(2) Date: Jun. 5, 2015

(87) PCT Pub. No.: WO2014/162561

PCT Pub. Date: Oct. 9, 2014

(65) Prior Publication Data

US 2015/0316016 A1 Nov. 5, 2015

(51) Int. Cl.
*F02N 15/06* (2006.01)
*F02N 11/08* (2006.01)

(52) U.S. Cl.
CPC ...... *F02N 11/0811* (2013.01); *F02N 11/0803* (2013.01); *F02N 11/0814* (2013.01);
(Continued)

(58) Field of Classification Search
CPC .. F02N 11/08; F02N 11/0903; F02N 11/0811; F02N 11/0814; F02N 11/0818;
(Continued)

(56) References Cited

U.S. PATENT DOCUMENTS 6,505,594 B1 * 1/2003 Katayama ............. F02D 31/002 123/179.18
6,530,861 B1 * 3/2003 Nakashima ........... B60W 10/02 477/105
(Continued)

FOREIGN PATENT DOCUMENTS

CN 101852160 A 10/2010
JP 2001-248493 A 9/2001
(Continued)

OTHER PUBLICATIONS

International search report for PCT/JP2013/060338.*
(Continued)

*Primary Examiner* — Jacob M Amick
*Assistant Examiner* — Michael A Kessler
(74) *Attorney, Agent, or Firm* — Sughrue Mion, PLLC; Richard C. Turner

(57) ABSTRACT

An engine automatic-stop/restart system includes a starting apparatus drive start setting unit that sets in an output comparison register a starting apparatus drive starting time instant obtained by adding a calculated starting apparatus drive start waiting time to a present time instant read from a free-running counter and that starts drive of a starting apparatus when the set starting apparatus drive starting time instant and the value of the free-running counter coincide with each other.

4 Claims, 10 Drawing Sheets

(52) U.S. Cl.
CPC ........ *F02N 11/0818* (2013.01); *F02N 15/067* (2013.01); *F02N 2200/022* (2013.01); *F02N 2200/0801* (2013.01); *F02N 2200/101* (2013.01); *F02N 2300/2011* (2013.01); *Y02T 10/48* (2013.01)

(58) Field of Classification Search
CPC ............. F02N 11/0844; F02N 11/0848; F02N 11/0855; F02N 11/101; F02N 2200/021; F02N 2200/022; F02N 2300/2006; F02N 2300/2011; F02N 15/067; F02D 41/04; F02D 41/042; F02D 41/06; F02D 41/061; F02D 41/062; F02D 41/08; F02D 41/009; F02D 41/2451; F02D 2200/1012; F02D 17/04; Y02T 10/48
USPC .................... 701/112, 113; 123/179.3, 179.4
See application file for complete search history.

(56) References Cited

U.S. PATENT DOCUMENTS 8,671,903 B2 * 3/2014 Notani ................ F02N 11/0855 123/179.4
9,267,479 B2 * 2/2016 Kitano .................... F02N 11/00
9,739,249 B2 * 8/2017 Nakashima ........... F02N 11/101
2006/0048734 A1 * 3/2006 Kataoka ................. B60K 6/485 123/179.4
2006/0113938 A1 6/2006 Arai
2010/0180849 A1 7/2010 Senda et al.
2013/0289855 A1 10/2013 Kitano et al.

FOREIGN PATENT DOCUMENTS

JP 2006-158119 A 6/2006
JP 4735737 B2 7/2011
WO 2013/031432 A1 3/2013

OTHER PUBLICATIONS

English translation of the international search authroity opinion of international search report for PCT/JP2013/060338.*

Communication dated Nov. 10, 2015 from the Japanese Patent Office issued in corresponding Japanese application No. 2015-509811.

Communication dated Aug. 8, 2016 from the State Intellectual Property Office of the P.R.C. in counterpart Application No. 201380075298.6.

English Full Translation of JP 2001-248493 A, published on Sep. 14, 2001.

English Full Translation of JP 2006-158119 A, published on Jun. 15, 2006.

International Search Report for PCT/JP2013/060338 dated Jul. 9, 2013.

* cited by examiner

ENGINE AUTOMATIC-STOP/RESTART SYSTEM AND ENGINE AUTOMATIC-STOP/RESTART METHOD

CROSS REFERENCE TO RELATED APPLICATIONS

This application is a National Stage of International Application No. PCT/JP2013/060338 filed Apr. 4, 2013, the contents of which are incorporated herein by reference in their entirety.

TECHNICAL FIELD

The present invention relates to an engine automatic-stop/restart system that automatically stops an engine when a predetermined engine automatic stopping condition is satisfied and then restarts the engine when an engine restarting condition is satisfied and relates to an engine automatic-stop/restart method.

BACKGROUND ART

To date, an engine automatic-stop/restart system has been developed for the purpose of improving the gasoline mileage of a vehicle such as an automobile and reducing an environmental load. When due to a driver's operation, a predetermined condition (e.g., brake-on operation under a predetermined vehicle speed or lower) for stopping an engine is satisfied, an engine automatic-stop/restart system automatically cuts off the fuel so as to automatically stop the engine. After that, when due to the driver's operation, a predetermined condition (e.g., brake-releasing operation, accelerator pedal step-on operation, or the like) for restarting the engine is satisfied, the engine automatic-stop/restart system restarts fuel injection so that the engine is automatically restarted.

As such an engine automatic-stop/restart system, for example, in the method of making a starter pinion gear engage with a ring gear and a starter control apparatus disclosed in Patent Document 1, a rotation orbit along which the rotation speed becomes zero is estimated based on the engine rotation speed obtained from a crank pulse; from the estimated rotation orbit, there is estimated a timing at which the rotation speed becomes zero; then, the estimated timing is periodically monitored and at a time when a driving timing is reached, the starter is driven.

PRIOR ART REFERENCE

Patent Document

[Patent Document 1] Japanese Patent No. 4735737

DISCLOSURE OF THE INVENTION

Problems to be Solved by the Invention

However, such a conventional system as described above has following problems. That is to say, in the engine automatic-stop/restart system disclosed in Patent Document 1, the timing of driving the starter is periodically monitored; therefore, due to the time difference between the timing at which the starter should be driven and the monitoring period, the starter driving timing may be delayed. Due to an effect that is provided to processing at the monitoring timing by a higher-hierarchy interruption processing having a higher priority, the processing timing may be delayed; thus, because due to the delay in the processing timing, the pinion gear and the ring gear cannot engage with each other at an appropriate timing, an engaging sound is caused at a time when the pinion gear and the ring gear engage with each other or an excessive load is imposed on the pinion gear and the ring gear; therefore, the pinion gear and/or the ring gear may be broken.

Furthermore, the time difference caused by the delay in the periodical monitoring timing can be reduced by shortening the monitoring period; however, there has been a problem that when the monitoring period is shortened, the processing load on the CPU increases.

The present invention has been implemented in order to solve the foregoing problems in the conventional system; the objective thereof is to obtain an engine automatic-stop/restart system that suppresses an engaging sound at a time when the pinion gear and the ring gear engage with each other, that imposes no excessive load on the pinion gear and the ring gear, and that can reduce the processing load on the CPU.

The objective of the present invention is to obtain an engine automatic-stop/restart system method that suppresses an engaging sound at a time when the pinion gear and the ring gear engage with each other, that imposes no excessive load on the pinion gear and the ring gear, and that can reduce the processing load on the CPU.

Means for Solving the Problems

An engine automatic-stop/restart system according to the present invention stops fuel injection into an engine so as to stop the engine when an engine automatic stopping condition is satisfied and then restarts the engine when an engine restarting condition is satisfied. The engine automatic-stop/restart system is characterized by including a crank angle sensor that outputs a crank pulse signal in accordance with a crank angle of a crankshaft of the engine; a starting apparatus that cranks the crankshaft so as to restart the engine; a starting apparatus drive start waiting time calculation unit that calculates, while the engine is inertially rotating, a starting apparatus drive start waiting time in which an engine rotation speed becomes the same as or lower than a predetermined threshold value, based on a gradient of a change in the engine rotation speed and the engine rotation speed detected on the basis of an output of the crank angle sensor; and a starting apparatus drive start setting unit that sets in an output comparison register provided in an microcomputer a starting apparatus drive starting time instant obtained by adding the calculated starting apparatus drive start waiting time to a present time instant read from a free-running counter provided in the microcomputer and that starts drive of the starting apparatus by use of an output comparison register function, of the microcomputer, that generates an output when the set starting apparatus drive starting time instant and the value of the free-running counter coincide with each other.

An engine automatic-atop/restart method according to the present invention stops fuel injection into an engine so as to stop the engine when an engine automatic stopping condition is satisfied and then restarts the engine when an engine restarting condition is satisfied. The engine automatic-stop/restart method is characterized in that while the engine is inertially rotating, a starting apparatus drive start waiting time in which a rotation speed of the engine becomes the same as or lower than a predetermined threshold value is calculated based on the engine rotation speed and a gradient of a change in the engine rotation speed; a starting apparatus drive starting time instant is set by adding the calculated starting apparatus drive start waiting time to a present time instant; then, when the present time instant coincides with the set starting apparatus drive starting time instant, drive of the starting apparatus is started.

Advantage of the Invention

An engine automatic-stop/restart system according to the present invention includes a starting apparatus drive start waiting time calculation unit that calculates, while the engine is inertially rotating, a starting apparatus drive start waiting time in which an engine rotation speed becomes lower than a predetermined threshold value, based on a gradient of a change in the engine rotation speed and the engine rotation speed detected on the basis of an output of the crank angle sensor; and a starting apparatus drive start setting unit that sets in an output comparison register provided in an microcomputer a starting apparatus drive starting time instant obtained by adding the calculated starting apparatus drive start waiting time to a present time instant read from a free-running counter provided in the microcomputer and that starts drive of the starting apparatus by use of an output comparison register function, of the microcomputer, that generates an output when the set starting apparatus drive starting time instant and the value of the free-running counter coincide with each other. Accordingly, the sound produced by engagement between a pinion gear and a ring gear is suppressed, and no excessively large load is imposed on either the pinion gear or the ring gear; concurrently, the processing load on the CPU can be reduced.

In an engine automatic-stop/restart method according to the present invention, while the engine is inertially rotating, a starting apparatus drive start waiting time in which a rotation speed of the engine becomes lower than a predetermined threshold value is calculated based on the engine rotation speed and a gradient of a change in the engine rotation speed; a starting apparatus drive starting time instant is set by adding the calculated starting apparatus drive start waiting time to a present time instant; then, when the present time instant coincides with the set starting apparatus drive starting time instant, drive of the starting apparatus is started. Accordingly, the sound produced by engagement between a pinion gear and a ring gear is suppressed, and no excessively large load is imposed on either the pinion gear or the ring gear; concurrently, the processing load on the CPU can be reduced.

BEST MODE FOR CARRYING OUT THE INVENTION

Figure 1:
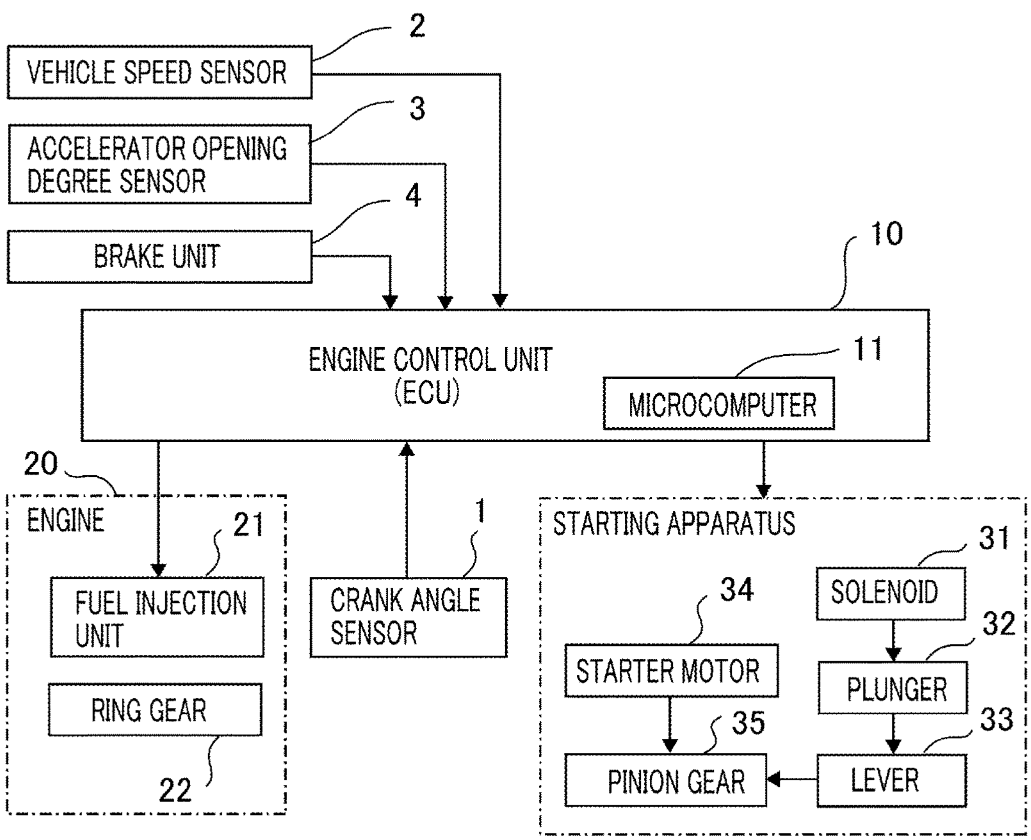
FIG. 1 is a block diagram illustrating an engine automatic-stop/restart system according to Embodiment 1 of the present invention.

Hereinafter, preferred embodiments of an engine automatic-stop/restart system and an engine automatic-stop/restart method according to the present invention will be explained with reference to the drawings. The explanation will be made with reference to the drawings, in each of which the same or similar constituent elements are designated by the same reference characters.

Embodiment 1

FIG. 1 is a block diagram illustrating an engine automatic-stop/restart system according to Embodiment 1 of the present invention. In FIG. 1, an engine automatic-stop/restart system according to Embodiment 1 of the present invention is provided with an engine control unit 10 for controlling an engine 20 and a starting apparatus 30 for starting the engine 20.

The engine 20 has a fuel injection unit 21 and a ring gear 22. The engine control unit 10 is connected with a crank angle sensor 1, a vehicle speed sensor 2, an accelerator opening degree sensor 3, a brake unit 4, the engine 20, and the starting apparatus 30. The starting apparatus 30 has a solenoid 31, a plunger 32, a lever 33, a starter motor 34, and a pinion gear 35.

The crank angle sensor 1 outputs a crank pulse signal corresponding to the crank angle of a crankshaft (unillustrated) of the engine 20. The vehicle speed sensor 2 detects the speed of a vehicle so as to output a vehicle speed signal. The accelerator opening degree sensor 3 outputs a voltage signal corresponding to the accelerator opening degree. The brake unit 4 outputs a brake signal in accordance with the operation state of a brake pedal.

The engine control unit 10 controls the drive of the fuel injection unit 21 of the engine 20, based on the crank pulse signal, the vehicle speed signal, the voltage signal, and the brake signal, and performs determination on a restart condition so as to control the start by the starting apparatus 30.

The fuel injection unit 21 of the engine 20 supplies a fuel to the engine 20, based on a driving command from the engine control unit 10.

In the starting apparatus 30, in response to the driving command from the engine control unit 10, firstly, the solenoid 31 is energized and hence the plunger 32 is attracted. Subsequently, because the plunger 32 is attracted, the pinion gear 35 is pushed out in the axis direction thereof through the intermediary of the lever 33; thus, the pinion gear 35 abuts against and engages with the ring gear 22. After that, due to the shift of the plunger 32, the contacts are closed; the starter motor 34 is energized; then, the pinion gear 35 is made to rotate.

The engine control unit 10 is configured with various kinds of interface circuits (hereinafter, referred to as an I/F circuit) (unillustrated) and a microcomputer 11. The microcomputer 11 is configured with an after-mentioned input/output interface (I/O) that performs inputting/outputting of a signal between the I/F circuit and the microcomputer 11, an A/D converter that converts analogue signals from the various kinds of sensors into digital signals, an after-mentioned computing processing unit (hereinafter, referred to as a CPU) that runs various kinds of control programs such as an engine automatic-stop/restart control program and the like, a free-running counter (hereinafter, referred to as an FRC) that periodically counts time, an output comparison register (hereinafter, referred to as an OCR) that stores a value to be compared with the value of the FRC, a comparator that compares the respective values of the FRC and the OCR, and transmits an interruption signal to the CPU and an output signal to the I/O when the respective values coincide with each other, an after-mentioned ROM that stores the engine automatic-stop/restart control program, various kinds of control programs and control constants, various kinds of tables, and the like, and an after-mentioned RAM that stores variables and the like at times when various kinds control programs are implemented; these constituent elements of the microcomputer 11 are not illustrated.

Figure 2:
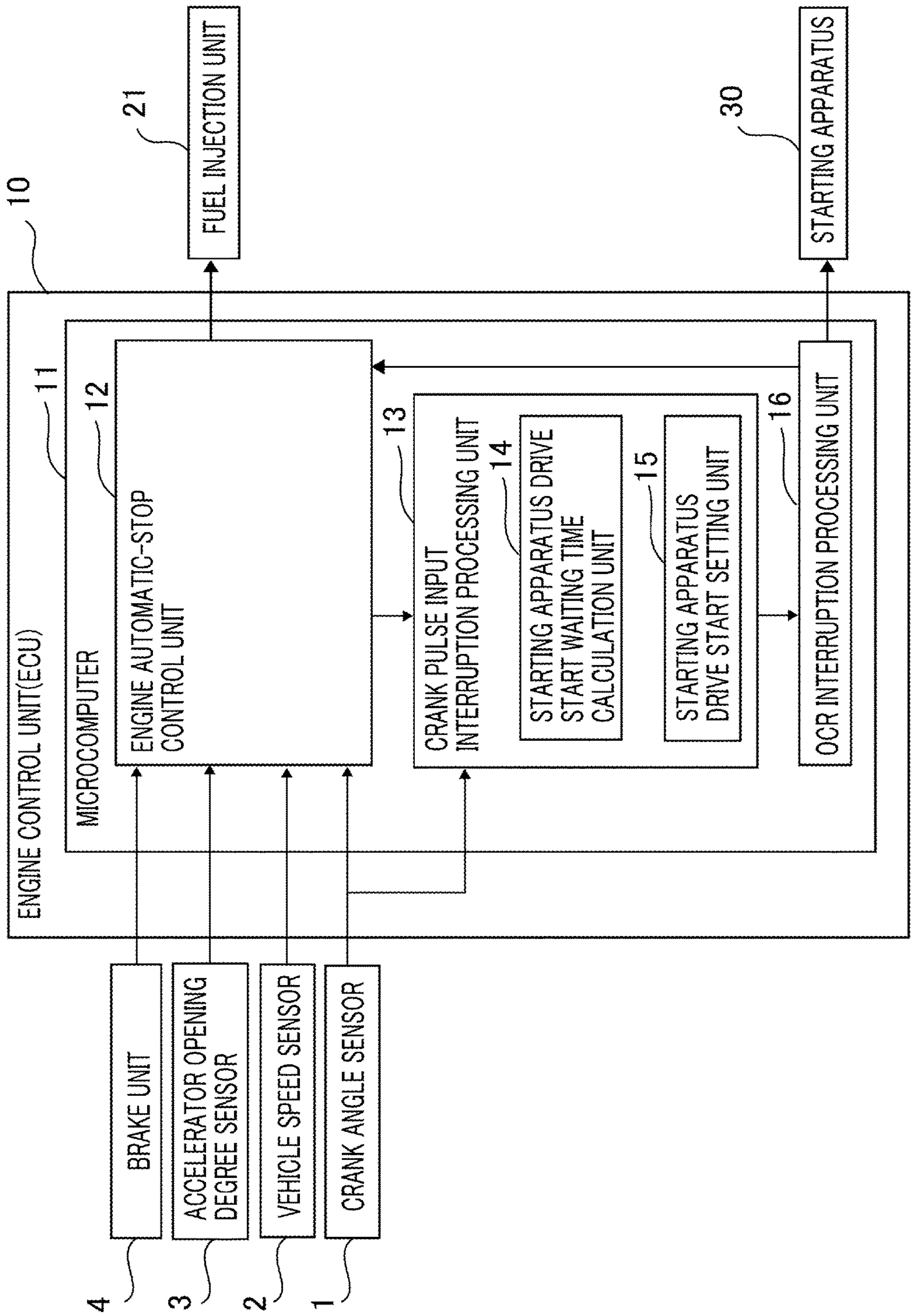
FIG. 2 is a block diagram illustrating the details of an engine control unit of the engine automatic-stop/restart system according to Embodiment 1 of the present invention.

FIG. 2 is a block diagram illustrating the details of an engine control unit 10 of the engine automatic-stop/restart system according to Embodiment 1 of the present invention. In FIG. 2, the microcomputer 11 included in the engine control unit 10 has an engine automatic-stop control unit 12, a crank pulse input interruption processing unit 13, and an OCR interruption processing unit 16. The crank pulse input interruption processing unit 13 has a starting apparatus drive start waiting time calculation unit 14 and a starting apparatus drive starting time setting unit 15.

At first, when determining that the automatic stopping condition for the engine 20 has been satisfied, based on the vehicle speed signal from the vehicle speed sensor 2, the voltage signal from the accelerator opening degree sensor 3, the brake signal from the brake unit 4, and the like, the engine automatic-stop control unit 12 stops the fuel injection unit 21. The engine automatic-stop control unit 12 indicates, with an automatic-stop flag F1, whether or not there exists an automatic-stop command based on the determination for automatically stopping of the engine 20.

Next, when determining that the restarting condition for the engine 20 has been satisfied, based on the voltage signal from the accelerator opening degree sensor 3, the brake signal from the brake unit 4, and the like, the engine automatic-stop control unit 12 outputs a driving command to the fuel injection unit 21 and indicates the driving command for the starting apparatus 30 with a starting apparatus drive start request flag F3.

The crank pulse input interruption processing unit 13 is activated at an inputting timing of the crank pulse signal from the crank angle sensor 1 and then calculates the crank pulse period, the engine rotation speed, and the gradient of a change in the engine rotation speed by use of the crank pulse signal.

Next, by use of the crank pulse period, the engine rotation speed, and the gradient of a change in the engine rotation speed that have been calculated by the crank pulse input interruption processing unit 13, the starting apparatus drive start waiting time calculation unit 14 calculates a starting apparatus drive starting time in which the rotation speed becomes lower than a predetermined threshold value at which the drive of the starting apparatus 30 is permitted.

Next, in accordance with the starting apparatus drive start request flag F3, the starting apparatus drive starting time setting unit 15 sets the starting apparatus drive starting time instant, obtained by adding a starting apparatus drive starting time to the present time instant read from the before-mentioned FRC in the microcomputer 11, in the before-mentioned OCR in the microcomputer 11; concurrently, the starting apparatus drive starting time setting unit 15 sets the output state at a time when an OCR interruption takes place and makes the OCR function effective so as to permit the OCR interruption.

The OCR interruption processing unit 16 is activated when an OCR interruption set by the starting apparatus drive starting time setting unit 15 takes place; when the OCR interruption takes place, a drive signal is outputted by way of the comparator, the I/O, and the I/F circuit in the engine control unit 10, which are not illustrated, and is applied to the starting apparatus 30 so that the drive of the s apparatus is started. At this time, the OCR interruption processing unit 16 resets the starting apparatus drive start request flag F3 so as to negate the OCR function.

When the starting apparatus 30 is energized and starts to be driven, the solenoid 31 is energized, at first; the plunger 32 is attracted; the pinion gear 35 is pushed out in the axis direction thereof through the intermediary of the lever 33; thus, the pinion gear 35 abuts against and engages with the ring gear 22. After that, due to the shift of the plunger 32, the contacts are closed; the starter motor 34 is energized; then, the pinion gear 35 is made to rotate.

Figure 3:
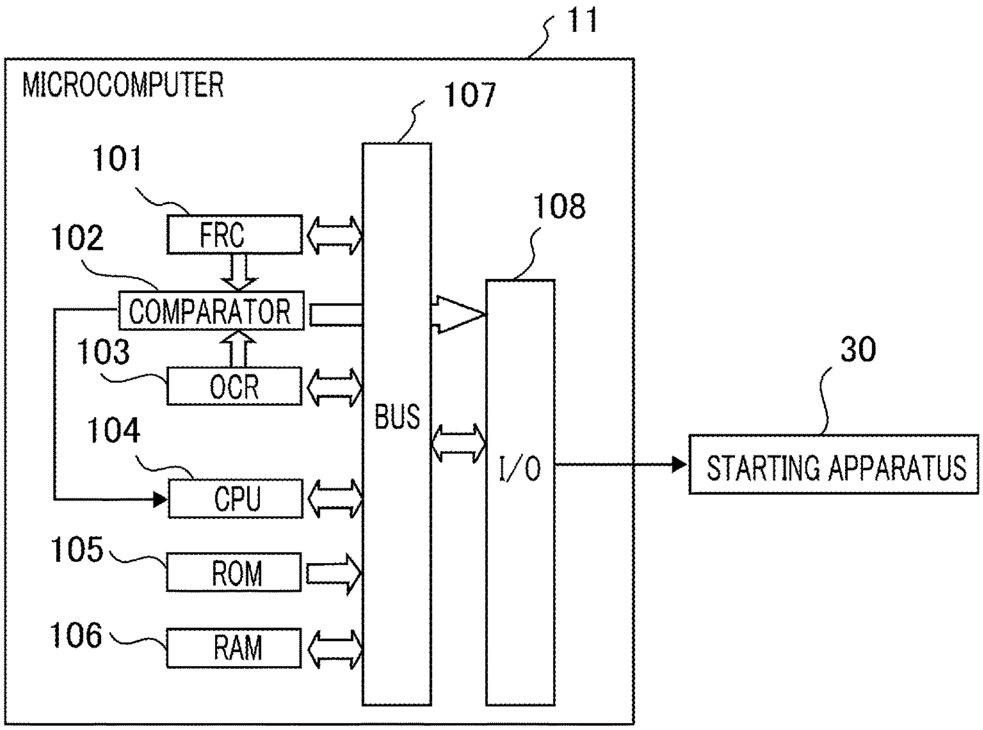
FIG. 3 is a configuration diagram illustrating a microcomputer of the engine automatic-stop/restart system according to Embodiment 1 of the present invention.

FIG. 3 is a configuration diagram illustrating the microcomputer of the engine automatic-atop/restart system according to Embodiment 1 of the present invention. In FIG. 3, the microcomputer 11 included in the engine control unit 10 has an FRC 101, a comparator 102, an OCR 103, a CPU 104, an ROM 105, an RAM 106, an I/O 108, and a bus 107 for connecting these elements.

The FRC 101 is constantly counted up by an internal clock of the microcomputer 11 so as to indicate the present time instant; the OCR 103 is a register for storing a time instant at which an OCR interruption takes place; the comparator 102 compares the respective values of the FRC 101 and the OCR 103; in the case where the values coincide with each other, the comparator 102 transmits an interruption signal to the CPU 104 and the output signal to the I/O 108.

The ROM 105 stores an engine automatic-stop/restart control program, various kinds of other control programs and control constants, various kinds of tables, and the like; the RAM 106 stores variables and the like at a time when various kinds of control programs are implemented. The CPU 104 reads the control programs from the ROM 105 through the bus 107 and implements the control programs for various kinds of data items while performing data writing and reading between the RAM 106 and itself. The CPU 104 issues an output instruction to the I/O 108 through the bus 107 so as to obtain input information.

Each of the output instructions from the comparator 102 and the CPU 104 drives the starting apparatus 30 by way of the I/O 108.

Figure 4:
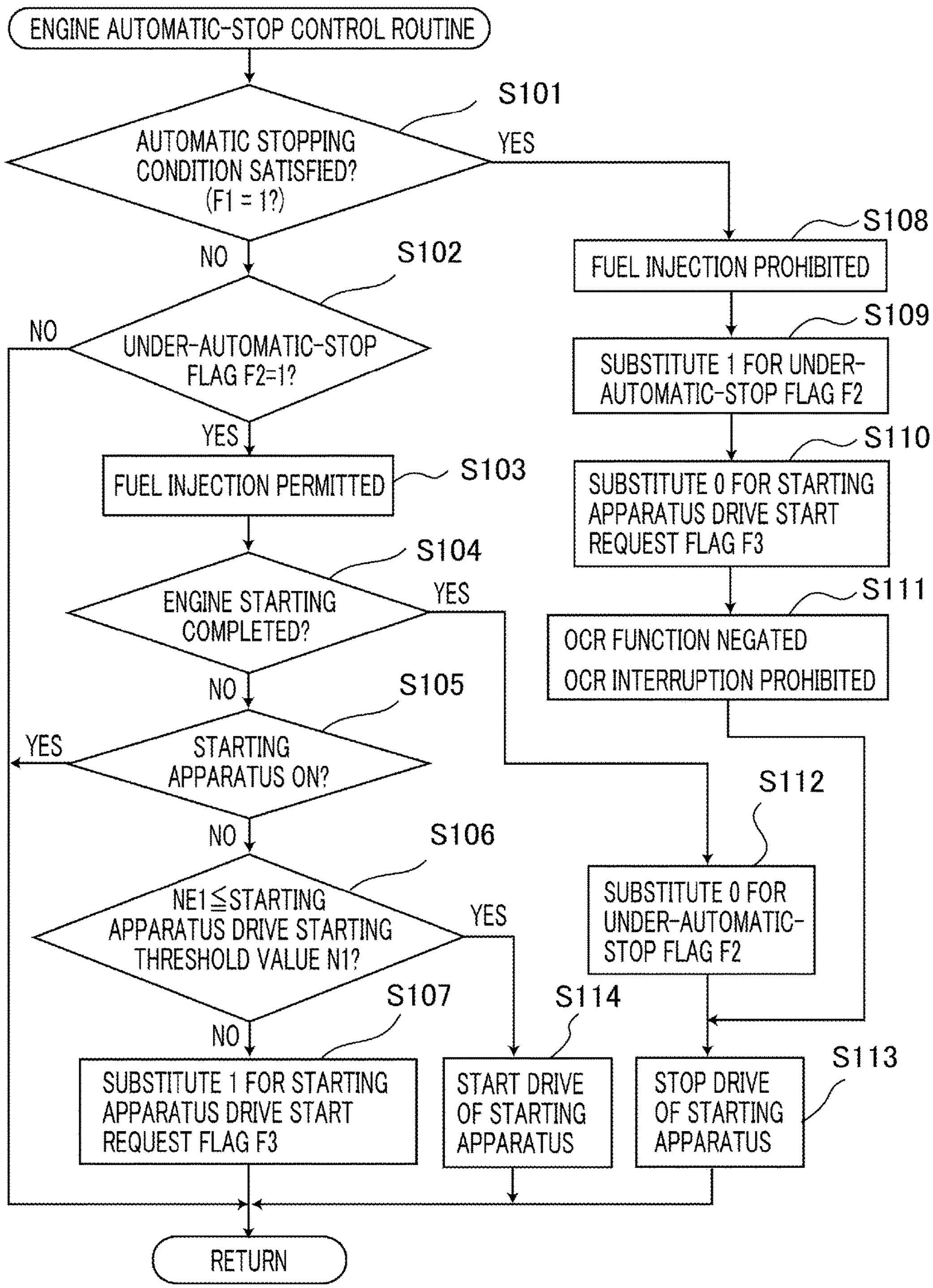
FIG. 4 is a flowchart representing an engine automatic-stop control routine in the engine automatic-stop/restart system and an engine automatic-stop/restart method according to Embodiment 1 of the present invention.

Next, with reference to the flowchart in FIG. 4, an engine automatic-stop control routine implemented by the engine automatic-stop control unit 12 will be explained. FIG. 4 is a flowchart representing the engine automatic-stop control routine in the engine automatic-stop/restart system and the engine automatic-stop/restart method according to Embodiment 1 of the present invention. This engine automatic-stop control routine is recurrently implemented every predetermined time, for example, every 10 ms.

In FIG. 4, at first, in the step S101, the engine automatic-stop control unit 12 determines whether or not the automatic stopping condition has been satisfied, i.e., the automatic-stop flag F1 is 1. In the case where in the step S101, it has been determined that because F1 is 0, the automatic stopping condition has not been satisfied (NO), the step S101 is followed by the step S102.

In contrast, in the case where in the step S101, it has been determined that because F1 is 1, the automatic stopping condition has been satisfied (YES), the step S101 is followed by the step S108, where the engine automatic-stop control unit 12 prohibits fuel injection; then, in the step S109, "1" is substituted for the under-automatic-stop flag F2. Next, in the step S110, "0" is substituted for the starting apparatus drive start request flag F3; in the step S111, the OCR function is negated so that OCR interruption is prohibited; then, in the step S113, the drive of the starting apparatus 30 is stopped and the processing in FIG. 4 is ended.

In the step S102 following the step S101, the engine automatic-stop control unit 12 determines whether or not the condition of being under automatic stop has been satisfied, i.e., the under-automatic-stop flag F2 is 1. In the case where in the step S102, it has been determined that because F2 is 0, the condition of being under automatic stop has not been satisfied (NO), the processing in FIG. 4 is ended.

In contrast, in the case where in the step S102, it has been determined that because F2 is 1, the condition of being under automatic stop has been satisfied (YES), the step S102 is followed by the step S103, where the engine automatic-stop control unit 12 permits fuel injection and then determines, in the step S104, whether or not starting of the engine has been completed.

In the step S104, the completion of starting the engine 20 is determined based on whether or not the engine rotation speed has exceeded a predetermined rotation speed. As the predetermined rotation speed, for example, 800 rpm is preliminarily set; however, the setting value of the predetermined rotation speed may differ depending on the engine 20 or a vehicle equipped with the engine 20. The rotation speed to be utilized in the determination performed in the step S104 is calculated by the engine control unit 10, based on the crank pulse signal from the crank angle sensor 1 illustrated in FIG. 2.

In the case where in the step S104, it is determined that the starting of the engine has been completed (YES), the step S104 is followed by the step S112, where the engine automatic-stop control unit 12 substitutes "0" for the under-automatic-stop flag F2; then, in the step S113, the drive of the starting apparatus 30 is stopped, and the processing in FIG. 4 is ended.

In contrast, in the case where in the step S104, it is determined that the starting of the engine has not been completed (NO), the step S104 is followed by the step S105, the engine automatic-stop control unit 12 determines whether or not the starting apparatus 30 has been activated.

In the case where in the step S105, it is determined that the starting apparatus 30 has started the drive (YES), the engine automatic-stop control unit 12 ends the processing in FIG. 4.

In contrast, in the case where in the step S105, it is determined that the starting apparatus 30 has not started the drive (NO), the step S105 is followed by the step S106, where the engine automatic-stop control unit 12 determines whether or not the present engine rotation speed NE1 is the same as or lower than a starting apparatus drive starting threshold value N1.

As the starting apparatus drive starting threshold value N1 which is a predetermined threshold value, for example, 100 r/min through 230 r/min is preliminarily set in accordance with the crank angle position; however, the setting value thereof may differ depending on the engine 20 or a vehicle equipped with the engine 20.

In the case where in the step S106, it is determined that the present engine rotation speed NE1 is the same as or lower than the starting apparatus drive starting threshold value N1 (YES), the step S106 is followed by the step S114, where the engine automatic-stop control unit 12 starts to drive the starting apparatus 30, and the processing in FIG. 4 is ended.

In contrast, in the case where in the step S106, it is determined that the present engine rotation speed NE1 is larger than the starting apparatus drive starting threshold value N1 (NO), the step S106 is followed by the step S107, where the engine automatic-stop control unit 12 substitutes "1" for the starting apparatus drive start request flag F3, and the processing in FIG. 4 is ended.

Figure 5A:
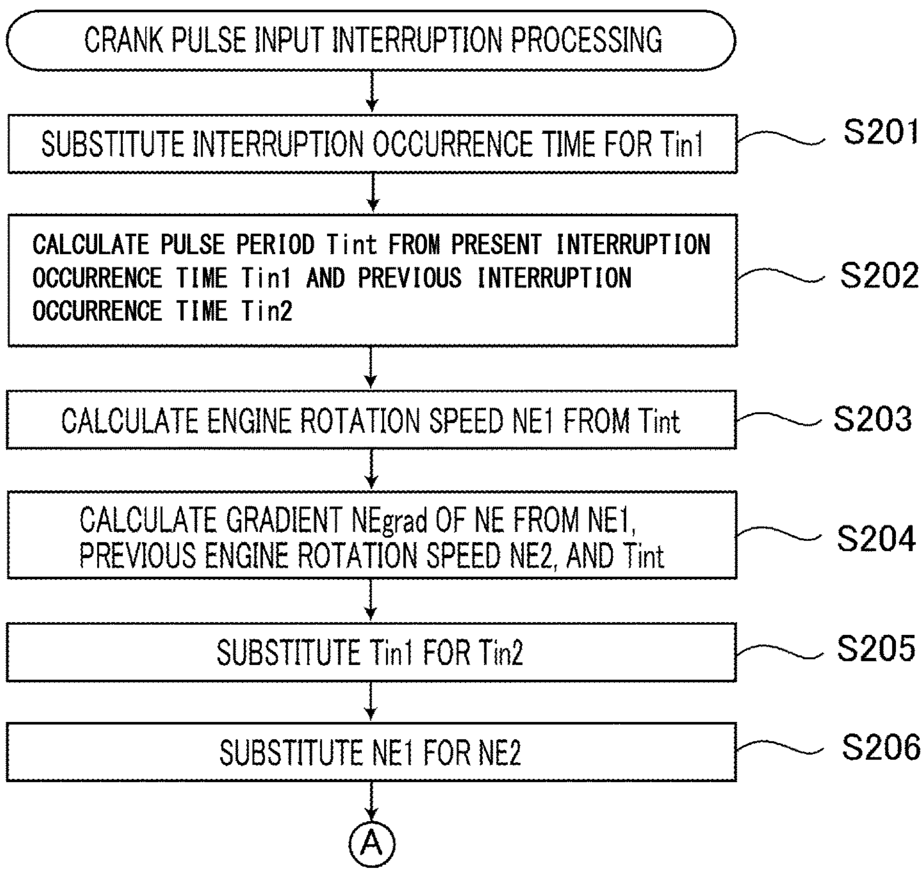
FIG. 5A and FIG. 5B are flowcharts representing crank pulse input interruption processing in the engine automatic-stop/restart system and the engine automatic-stop/restart method according to Embodiment 1 of the present invention.
Figure 5B:
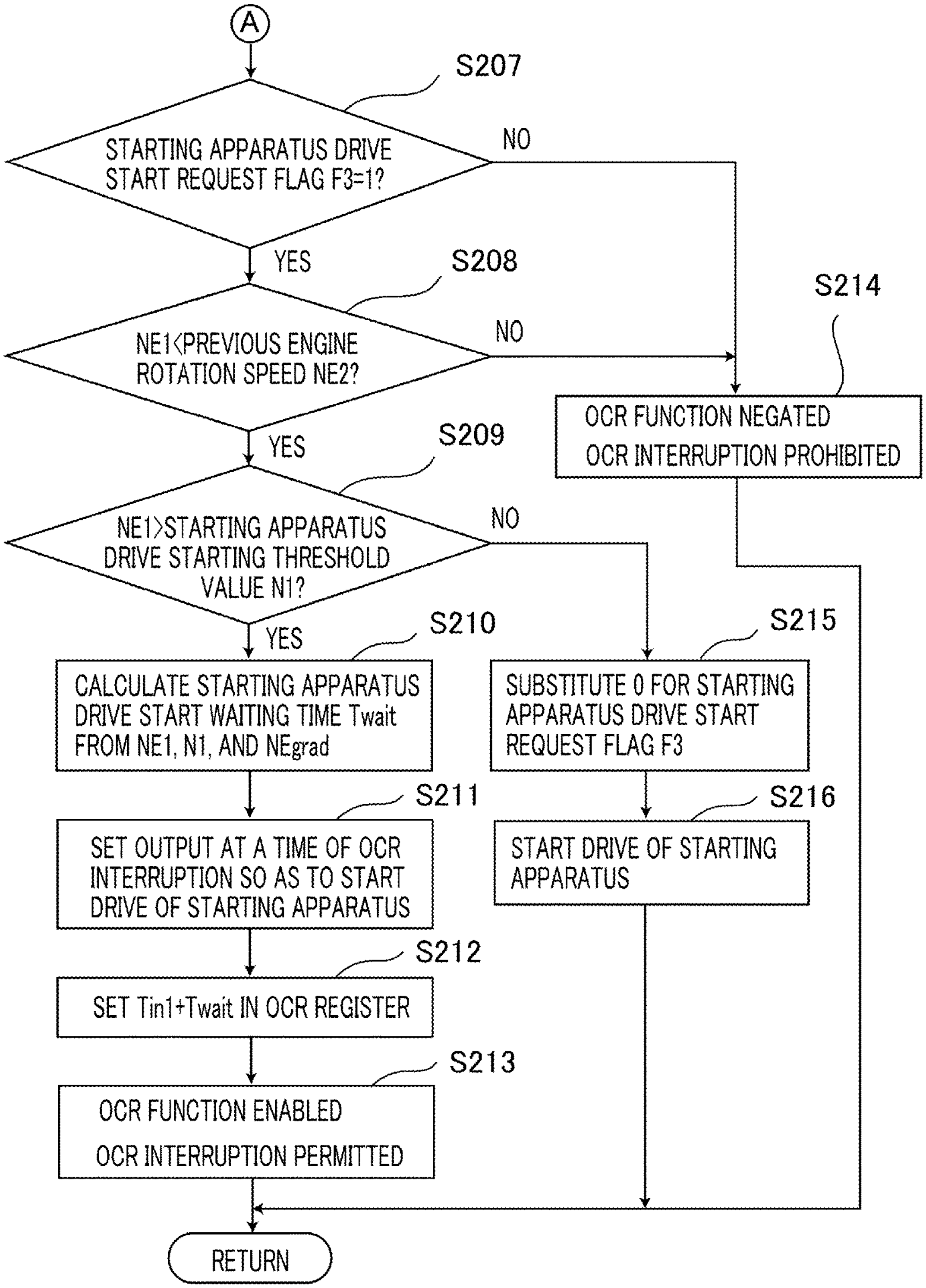

Next, with reference to the flowchart in FIGS. 5A and 5B, crank pulse input interruption processing, implemented by the crank pulse input interruption processing unit 13 at a crank pulse input timing, will be explained. FIGS. 5A and 5B are flowcharts representing crank pulse input interruption processing in the engine automatic-stop/restart system and the engine automatic-stop/restart method according to Embodiment 1 of the present invention.

In FIGS. 5A and 5B, at first, in the step S201, the crank pulse input interruption processing unit 13 substitutes an crank pulse input interruption occurrence time for Tin1; then, the step S201 is followed by the step S202.

In the step S202, the crank pulse input interruption processing unit 13 substitutes a value, obtained by subtracting the immediately previous crank pulse input interruption occurrence time Tin2 from the present crank pulse input interruption occurrence time Tin1, for the crank pulse input period Tint; then, the step S202 is followed by the step S203.

In the step S203, the crank pulse input interruption processing unit 13 calculates an engine rotation speed from the crank pulse input period Tint and substitutes the calculated engine rotation speed for the present engine rotation speed NE1; then, the step S203 is followed by the step S204.

In the step S204, the crank pulse input interruption processing unit 13 calculates the equation [(NE1−NE2) ÷Tin1], based on the present engine rotation speed NE1, the immediately previous engine rotation speed NE2, and the crank pulse input period Tint, and substitutes the calculated value for a gradient NEgrad of the engine rotation speed in the time interval between the crank pulses; then, the step S204 is followed by the step S205.

Subsequently, in the step S205, the crank pulse input interruption processing unit 13 substitutes the present crank pulse input interruption occurrence time Tin1 for the immediately previous crank pulse input interruption occurrence time Tin2; in the step S206, the present engine rotation speed NE1 is substituted for the immediately previous engine rotation speed NE2; then, in the step S207, it is determined whether or not the starting apparatus drive starting command has been issued, i.e., the starting apparatus drive start request flag F3 is "1".

In the case where because in the step S207, the starting apparatus drive start request flag F3 is "0", it is determined that the starting apparatus drive starting command has not been issued (NO), the step S207 is followed by the step S214, where the crank pulse input interruption processing unit 13 negates the OCR function so as to prohibit the OCR interruption; then, the processing in FIGS. 5A and 5B are ended.

In contrast, in the case where because in the step S207, the starting apparatus drive starting command flag F3 is "1", it is determined that the starting apparatus drive starting command has been issued (YES), the step S207 is followed by the step S208, where the crank pulse input interruption processing unit 13 determines whether or not the present engine rotation speed NE1 is smaller than the immediately previous engine rotation speed NE2.

In the case where in the step S208, it is determined that the present engine rotation speed NE1 is the same as or larger than the immediately previous engine rotation speed NE2 (NO), the step S208 is followed by the step S214, where the crank pulse input interruption processing unit 13 negates the OCR function so as to prohibit the OCR interruption; then, the processing in FIGS. 5A and 5B are ended.

In contrast, in the case where in the step S208, it is determined that the present engine rotation speed NE1 is smaller than the immediately previous engine rotation speed NE2 (YES), the step S208 is followed by the step S209, where the crank pulse input interruption processing unit 13 determines whether or not the present engine rotation speed NE1 is larger than the starting apparatus drive starting threshold value N1.

In the case where in the step S209, it is determined that the present engine rotation speed NE1 is the same as or smaller than the starting apparatus drive starting threshold value N1 (NO), the step S209 is followed by the step S215, where the crank pulse input interruption processing unit 13 substitutes "0" for the starting apparatus drive start request flag F3; then, the step 215 is followed by the step S216, where the starting apparatus 30 is activated, and then the processing in FIGS. 5A and 5B are ended.

In contrast, in the case where in the step S209, it is determined that the present engine rotation speed NE1 is larger than the starting apparatus drive starting threshold value N1 (YES), the step S209 is followed by the step S210, where the crank pulse input interruption processing unit 13 calculates a starting apparatus drive start waiting time Twait in accordance with the equation[(N1−NE1)÷NEgrad], based on the present engine rotation speed NE1, the starting apparatus drive starting threshold value N1, and the gradient NEgrad of a change in the engine rotation speed in the time interval between the crank pulses; then, the step S210 is followed by the step S211.

In the step S211, the crank pulse input interruption processing unit 13 sets the output setting for the OCR function, which is outputted by the I/O 108 at a time when an OCR interruption occurs, in such a way that the drive of the starting apparatus 30 starts, and then the step S211 is followed by the step S212; the crank pulse input interruption processing unit 13 sets in the OCR 103, the time instant obtained by adding the starting apparatus drive start waiting time Twait to the crank pulse input interruption occurrence time Tin1, as the crank pulse input interruption occurrence time; then, in the step S213, the crank pulse input interruption processing unit 13 enables the OCR function so as to permit the OCR interruption, and then ends the processing in FIG. 5A and FIG. 5B.

Figure 6:
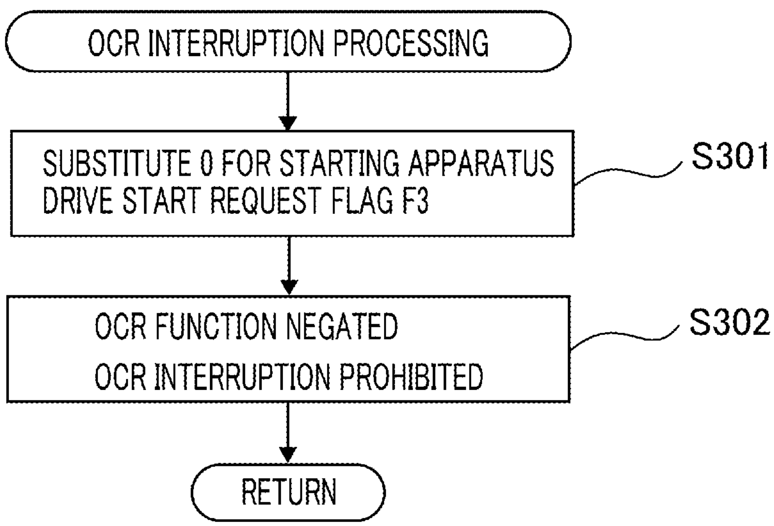
FIG. 6 is a flowchart representing OCR interruption processing in the engine automatic-stop/restart system and the engine automatic-stop/restart method according to Embodiment 1 of the present invention.

Next, with reference to the flowchart in FIG. 6, OCR interruption processing, implemented by the OCR interruption processing unit 16 at a timing when OCR interruption occurs, will be explained. FIG. 6 is a flowchart representing OCR interruption processing in the engine automatic-stop/restart system and the engine automatic-stop/restart method according to Embodiment 1 of the present invention. The flowchart represents OCR interruption processing in the engine automatic-stop/restart system according to Embodiment 1 of the present invention.

At a time when an OCR interruption occurs and the OCR interruption processing unit 16 illustrated in FIG. 2 implements its processing, the drive of the starting apparatus 30 has been started through the OCR function.

In FIG. 6, at first, in the step S301, the OCR interruption processing unit 16 substitutes "0" for the starting apparatus drive start request flag F3; then, in the step S302, the OCR interruption processing unit 16 negates the OCR function so as to prohibit the OCR interruption, and then ends the processing in FIG. 6.

Figure 7:
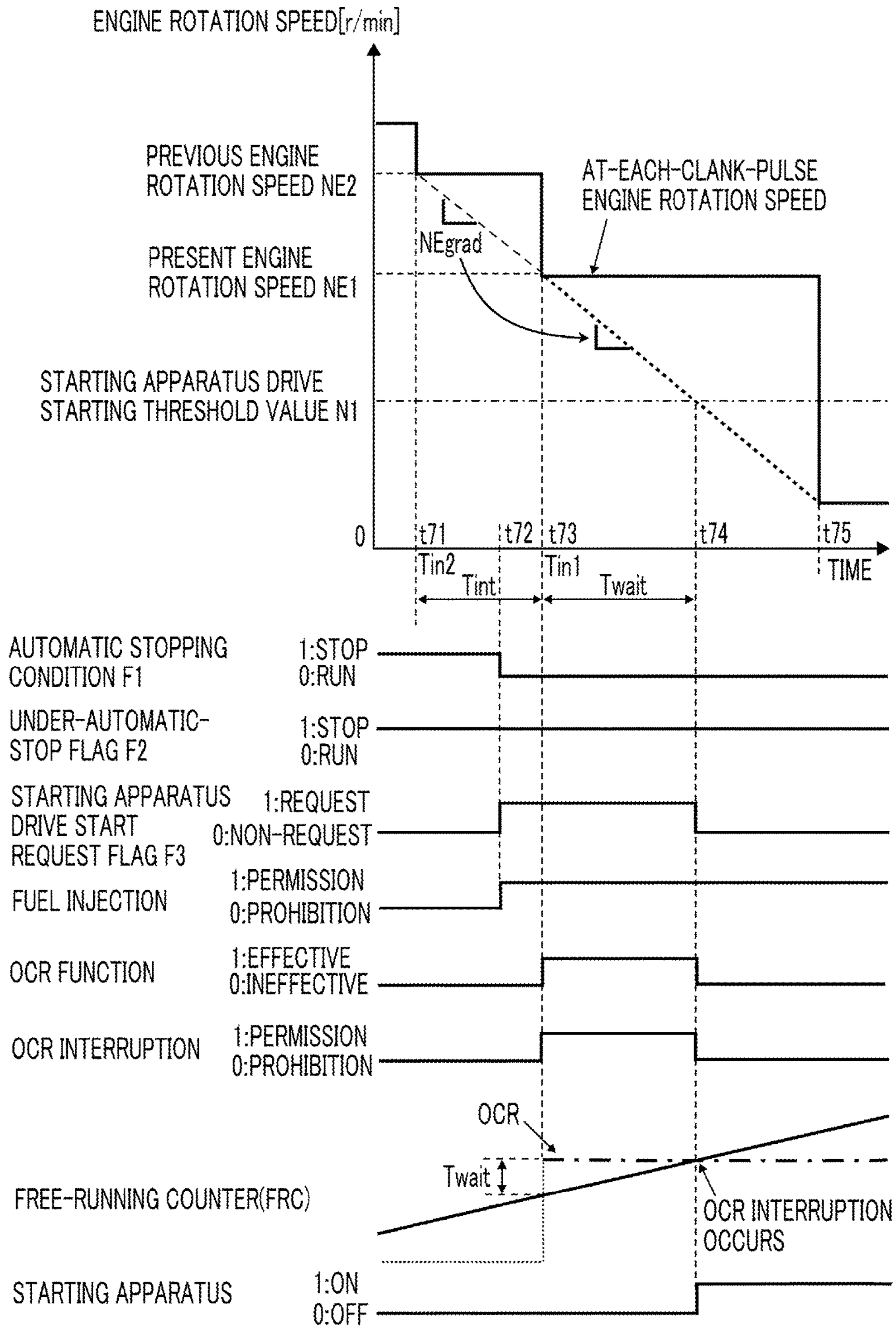
FIG. 7 is a timing chart representing the relationship among an engine automatic-stop control unit, a starting apparatus drive start waiting time calculation unit, and a start system ON setting unit at a time when the engine rotation speed simply decreases in the engine automatic-stop/restart system and the engine automatic-stop/restart method according to Embodiment 1 of the present invention.

Next, with reference to the timing chart represented in FIG. 7, the behaviors of the flags, the OCR function, and the starting apparatus 30 that are utilized in control performed in the engine automatic-stop/restart system according to Embodiment 1 of the present invention will be explained with a case, for example, where the engine rotation speed simply decreases. FIG. 7 is a timing chart representing the relationship among the engine automatic-stop control unit, the starting apparatus drive start waiting time calculation unit, and the starting apparatus drive start setting unit at a time when the engine rotation speed simply decreases in the engine automatic-stop/restart system and the engine automatic-stop/restart method according to Embodiment 1 of the present invention.

The timing chart represented in FIG. 7 starts with a condition that the automatic stopping condition F1 is "1" (stop), the under-automatic-stop flag F2 is "1" (stop), fuel injection is "0" (prohibited), and the engine 20 is inertially rotating.

At first, with reference to FIG. 7, there will be explained the behavior of an at-each-clank-pulse engine rotation speed. At time instants t71, t73, and t75, respective crank pulse signals are inputted; at each time instant, the at-each-clank-pulse engine rotation speed is updated as represented by a solid line. In the timing chart represented in FIG. 7, the input period of the crank pulse signal gradually extends, and the engine rotation speed continuously decreases.

Next, with reference to FIG. 7, the behavior of the automatic stopping condition F1 will be explained. When at a time instant t72, an idling stop release condition (engine restarting condition) such as releasing the brake is satisfied, the automatic stopping condition F1 turns from "1" (stop) to "0" (run).

Next, the behavior of the under-automatic-stop flag F2 will be explained. Because the automatic stopping condition F1 is "1" (stop), the under-automatic-stop flag F2 has turned to "1" (stop); after that, when the starting of the engine 20 is completed, the under-automatic-stop flag F2 turns to "0" (run); however, in the timing chart in FIG. 7, the under-automatic-stop flag F2 is kept to be "1" (stop).

Next, the behavior of the starting apparatus drive start request flag F3 will be explained. The starting apparatus drive start request flag F3 is kept to be "1" (request) in the interval from a time instant when the engine restarting condition is satisfied to a time instant when the drive of the starting apparatus 30 is started. In FIG. 7, when at the time instant t72, the automatic stopping condition F1 turns to "0" (run), the starting apparatus drive start request flag F3 turns to "1" (request); after that, the drive of the starting apparatus 30 is started; then, at a time instant t74 at which an OCR interruption occurs, the starting apparatus drive start request flag F3 turns to "0" (non-request).

Next, the behavior of fuel injection will be explained. When an idling stop condition is satisfied, fuel injection is prohibited [prohibition of fuel injection: 0], and when the idling stop release condition (engine restarting condition) is satisfied, fuel injection is permitted [permission of fuel injection: 1] and hence fuel injection is restarted. In FIG. 7, when at the time instant t72, the automatic stopping condition F1 turns to "0" (run), the fuel injection turns to "1" (permission of fuel injection).

At last, the behaviors of drive stopping and drive starting of the starting apparatus 30 by use of the OCR function will be explained. The OCR function operates in synchronization with an input timing of the crank pulse signal; when the starting apparatus drive start request flag F3 is "1" (request), the engine rotation speed is larger than the starting apparatus drive starting threshold value N1, and the engine rotation speed is decreasing, the OCR function is enabled so as to set the drive start timing of the starting apparatus 30.

In FIG. 7, at the time instant t73, because the starting apparatus drive start request flag F3 is "1" (request), the engine rotation speed is larger than the starting apparatus drive starting threshold value N1, and the present engine rotation speed NE1 is smaller than the immediately previous engine rotation speed NE2, the OCR function is enabled [effective: 1].

At first, From the present engine rotation speed NE1 at the time instant t73, the immediately previous engine rotation speed NE2 at the time instant t71, and the crank pulse signal input period Tint from the time instant t71 to the time instant t73, the gradient NEgrad in the engine rotation speed in the time interval from the time instant t71 to the time instant t73 is calculated based on the equation [(NE1−NE2)÷Tint].

Next, it is estimated that after the time instant t73, the engine rotation speed decreases with a gradient the same as that at and before the time instant t73; then, from the present engine rotation speed NE1 at the time instant t73, the gradient NEgrad in the engine rotation speed, and the starting apparatus drive starting threshold value N1, the starting apparatus drive start waiting time Twait in which the engine rotation speed reaches the starting apparatus drive starting threshold value N1 is calculated based on the equation[(N1−NE1)÷NEgrad]. The result of the calculation suggests that the time instant t74 that is obtained by adding the starting apparatus drive start waiting time Twait to the time instant t73 is an optimum timing for starting the drive of the starting apparatus 30.

Subsequently, the value obtained by adding the starting apparatus drive start waiting time Twait to the value of the FRC 101 at the time instant t73 is set in the OCR 103 so that there is set the time instant at which when an OCR interruption occurs, the drive of the starting apparatus 30 is started; then, the OCR function is enabled [effective: 1] so that the OCR interruption is permitted [permission: 1].

At the time instant t74, the present time, which is the value of the FRC 101 coincides with the time instant set in the OCR 103; thus, an OCR interruption occurs and hence the starting apparatus 30 is activated.

Simultaneously, at the time instant t74, the OCR interruption processing is activated; the starting apparatus drive start request flag F3 turns to "0" (non-request); the OCR function is negated; then, the OCR interruption is prohibited.

Figure 8:
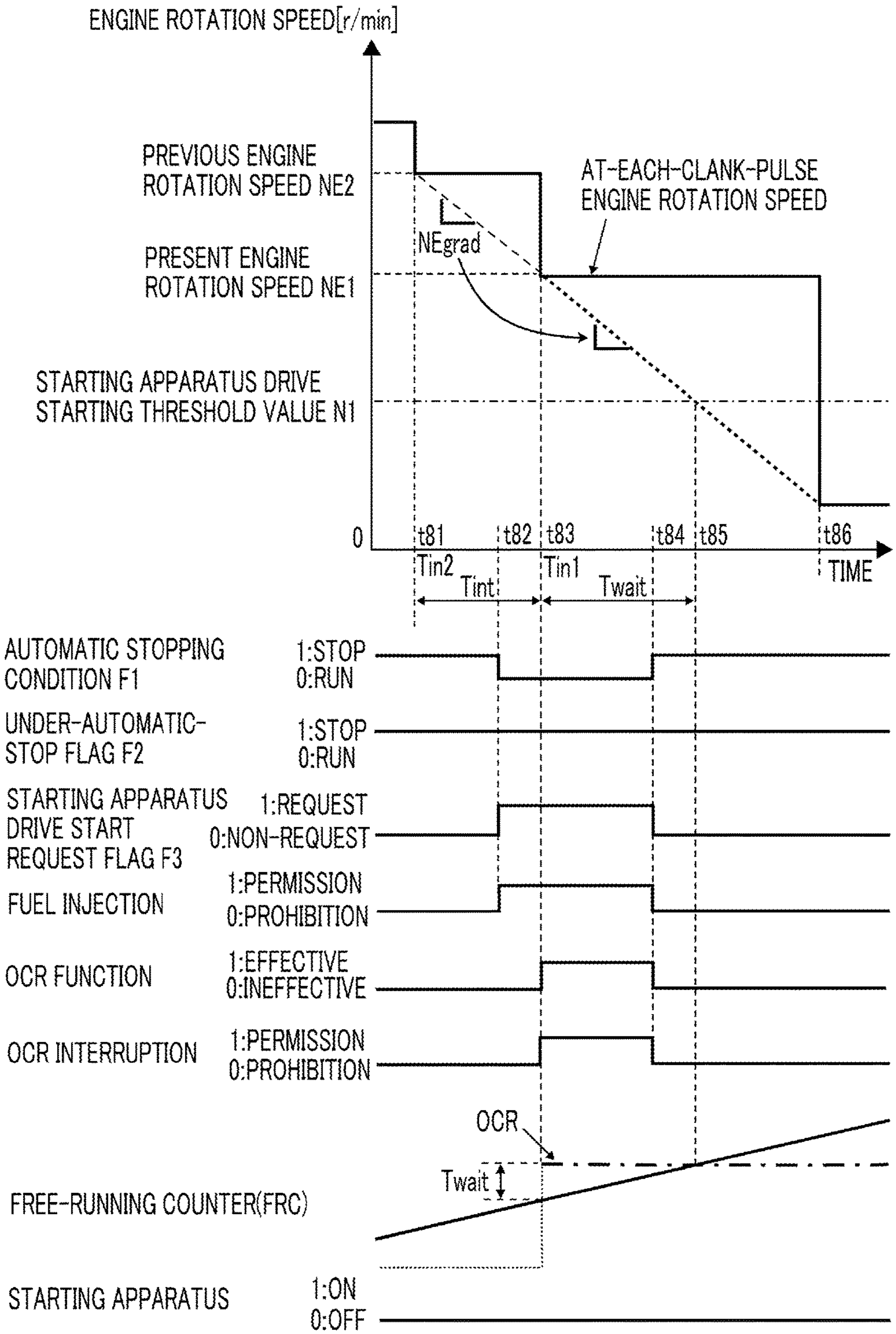
FIG. 8 is a timing chart representing the relationship among an engine automatic-stop control unit, a starting apparatus drive start waiting time calculation unit, and a start system ON setting unit at a time when the engine rotation speed simply decreases in the engine automatic-stop/restart system and the engine automatic-stop/restart method according to Embodiment 1 of the present invention.

Subsequently, with reference to the timing chart represented in FIG. 8, the behaviors of the flags, the OCR function, and the starting apparatus 30 that are utilized in control performed in the engine automatic-stop/restart system according to Embodiment 1 of the present invention will be explained with a case, for example, where the engine rotation speed simply decreases. FIG. 8 is a timing chart representing the relationship among the engine automatic-stop control unit, the starting apparatus drive start waiting time calculation unit, and the starting apparatus drive start setting unit at a time when the engine rotation speed simply decreases in the engine automatic-stop/restart system and the engine automatic-stop/restart method according to Embodiment 1 of the present invention.

The timing chart represented in FIG. 8 starts with a condition that the automatic stopping condition F1 is "1" (stop), the under-automatic-stop flag F2 is "1" (stop), fuel injection is "0" (prohibited), and the engine 20 is inertially rotating.

Firstly, in FIG. 8, with regard to the behavior of the at-each-clank-pulse engine rotation speed, respective crank pulse signals are inputted at time instants t81, t83, and t86 and hence the at-each-clank-pulse engine rotation speed is updated at the time instants t81, t83, and t86. In the timing chart represented in FIG. 8, the input period of the crank pulse signal gradually extends, and the engine rotation speed continuously decreases.

Next, with reference to FIG. 8, the behavior of the automatic stopping condition F1 will be explained. When at a time instant t82, the idling stop release condition (engine restarting condition) such as releasing the brake is satisfied, the automatic stopping condition F1 turns to "0" (run). Then, at a time instant t84 at which the idling stop condition (engine stopping condition) such as applying the brake is satisfied, the automatic stopping condition F1 turns to "1" (stop).

Next, the behavior of the under-automatic-stop flag F2 will be explained. Because the automatic stopping condition F1 is "1" (stop), the under-automatic-stop flag F2 turns to "1" (stop); after that, when the starting of the engine 20 is completed, the under-automatic-stop flag F2 turns to "0" (run). In the timing chart in FIG. 8, the under-automatic-stop flag F2 is kept to be "1" (stop).

Next, the behavior of the starting apparatus drive start request flag F3 will be explained. The starting apparatus drive start request flag F3 is kept to be "1" (request) in the interval from a time instant when the engine restarting condition is satisfied to a time instant when the drive of the starting apparatus 30 is started. In FIG. 8, because at a time instant t82, the automatic stopping condition F1 is "0" (run), the starting apparatus drive start request flag F3 turns to "1" (request); after that, at a time instant t84 at which the automatic stopping condition F1 turns to "1" (stop), the starting apparatus drive start request flag F3 turns to "0" (non-request).

Next, the behavior of fuel injection will be explained. When the idling stop condition is satisfied, fuel injection is prohibited [prohibition of fuel injection: 0], and when the idling stop release condition (engine restarting condition) is satisfied, fuel injection is permitted [permission of fuel injection: 1] and hence fuel injection is restarted. In FIG. 8, because at the time instant t82, the automatic stopping condition F1 is "1" (run), the fuel injection flag turns to "1" (permission); after that, at the time instant t84 at which the automatic stopping condition F1 turns to "1" (stop), the fuel injection flag turns to "0" (prohibition).

At last, the behavior, based on the OCR function, of the starting apparatus 30 will be explained. The OCR function operates in synchronization with an input timing of the crank pulse signal; when the starting apparatus drive start request flag F3 is "1" (request), the engine rotation speed represented in FIG. 8 is larger than the starting apparatus drive starting threshold value N1, and the engine rotation speed is decreasing, the OCR function is enabled so as to set the drive start timing of the starting apparatus 30.

In FIG. 8, at the time instant t83, because the starting apparatus drive start request flag F3 is "1" (request), the engine rotation speed is larger than the starting apparatus drive starting threshold value N1, and the present engine rotation speed NE1 is smaller than the immediately previous engine rotation speed NE2, the OCR function is enabled [effective: 1].

At first, From the present engine rotation speed NE1 at the time instant t83, the immediately previous engine rotation speed NE2 at the time instant t81, and the crank pulse signal input period Tint from the time instant t81 to the time instant t83, the gradient NEgrad in the engine rotation speed in the time interval from the time instant t81 to the time instant t83 is calculated based on the equation [(NE1−NE2)÷Tint].

Next, it is estimated that after the time instant t83, the engine rotation speed decreases with a gradient the same as that at and before the time instant t83; then, from the present engine rotation speed NE1 at the time instant t83, the gradient NEgrad in the engine rotation speed, and the starting apparatus drive starting threshold value N1, the starting apparatus drive start waiting time Twait in which the engine rotation speed reaches the starting apparatus drive starting threshold value N1 is calculated based on the equation[(N1−NE1)÷NEgrad]. The result of the calculation suggests that the time instant t85 that is obtained by adding the starting apparatus drive start waiting time Twait to the time instant t83 is an optimum timing for starting the drive of the starting apparatus 30.

Subsequently, the value obtained by adding the starting apparatus drive start waiting time Twait to the value of the FRC 101 at the time instant t83 is set in the OCR 103 so that setting for starting the drive of the starting apparatus 30 when an OCR interruption occurs is implemented; then, the OCR function is enabled [effective: 1] so that the OCR interruption is permitted [permission: 1].

When at the time instant t84, the automatic stopping condition F1 becomes "1" (stop), the OCR function is negated (ineffective: 0) so that OCR interruption is prohibited (prohibition: 0). As a result, the drive of the starting apparatus 30 is not started and hence the engine is kept stopped.

Figure 9:
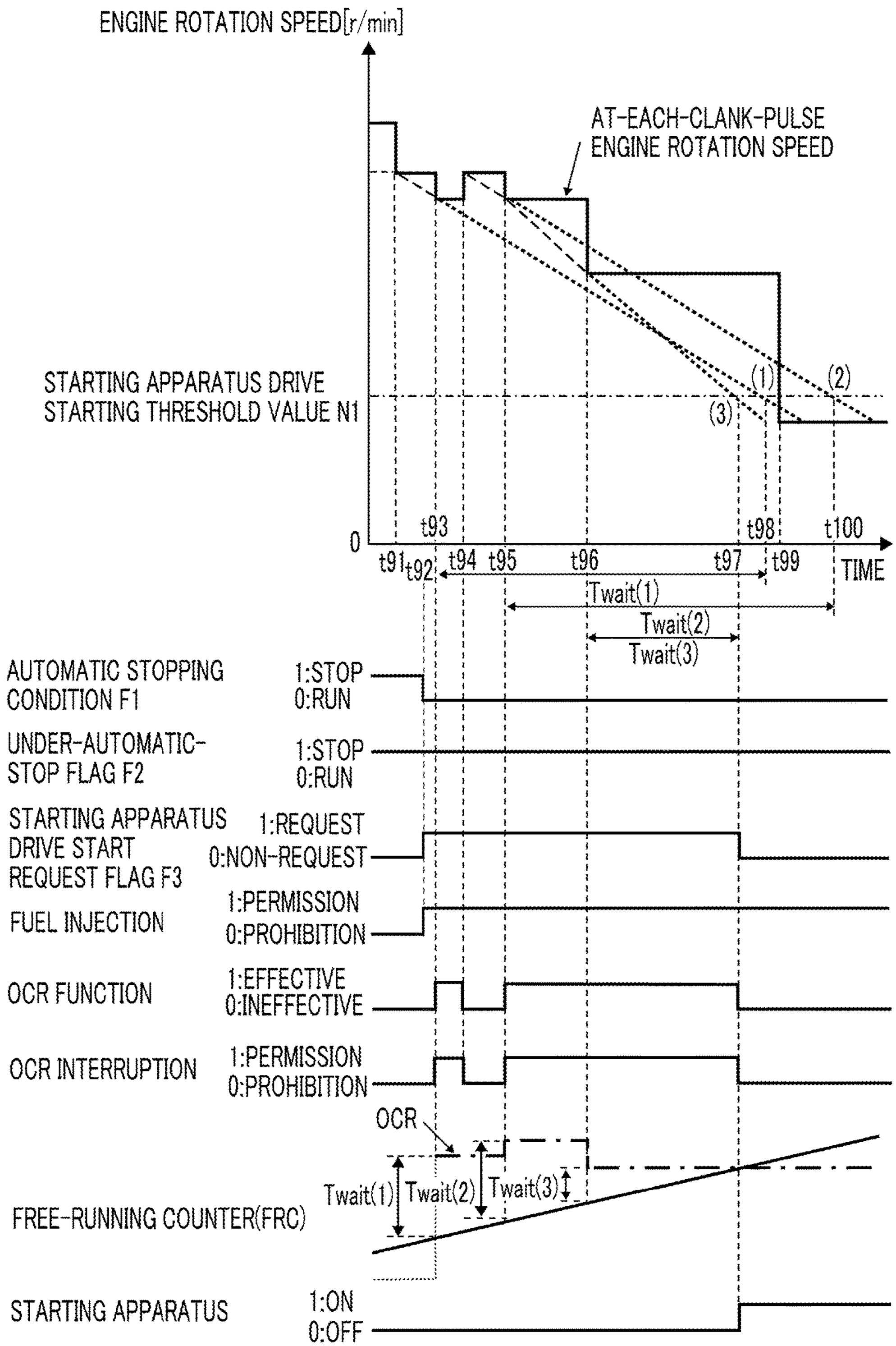
FIG. 9 is a timing chart representing the relationship among the engine automatic-stop control unit, the starting apparatus drive start waiting time calculation unit, and the starting apparatus ON setting unit in accordance with the rotation behavior of the engine rotation speed in the engine automatic-stop/restart system and the engine automatic-stop/restart method according to Embodiment 1 of the present invention.

Subsequently, with reference to the timing chart represented in FIG. 9, the behaviors of the flags, the OCR function, and the starting apparatus 30 that are utilized in control performed in the engine automatic-stop/restart system according to Embodiment 1 of the present invention will be explained with a case, for example, where the engine rotation speed decreases in a fluctuating manner. FIG. 9 is a timing chart representing the relationship among the engine automatic-stop control unit, the starting apparatus drive start waiting time calculation unit, and the starting apparatus ON setting unit in accordance with the rotation behavior of the engine rotation speed in the engine automatic-stop/restart system and the engine automatic-stop/restart method according to Embodiment 1 of the present invention.

The timing chart represented in FIG. 9 starts with a condition that the automatic stopping condition F1 is "1" (stop), the under-automatic-stop flag F2 is "1" (stop), fuel injection is "0" (prohibited), and the engine 20 is inertially rotating.

In FIG. 9, firstly, with regard to the behavior of the at-each-clank-pulse engine rotation speed, respective crank pulse signals are inputted at time instants t91, t93, t94, t95, t96, and t99 and hence the at-each-clank-pulse engine rotation speed is updated at the time instants t91, t93, t94, t95, t96, and t99. In the timing chart in FIG. 9, the engine rotation speed decreased in the interval from the time instant t91 to the time instant t93; the engine rotation speed temporarily increases at the time instant t94; then, at each of the time instants t95, t96, and t99, the engine rotation speed gradually decreases.

Next, the behavior of the automatic stopping condition F1 will be explained. When at a time instant t92, the idling stop release condition (engine restarting condition) such as releasing the brake is satisfied, the automatic stopping condition F1 turns to "0" (run).

Next, the behavior of the under-automatic-stop flag F2 will be explained. Because the automatic stopping condition F1 is "1" (stop), the under-automatic-stop flag F2 turns to "1" (stop); after that, when the starting of the engine 20 is completed, the under-automatic-stop flag F2 turns to "0" (run). In the timing chart in FIG. 9, the under-automatic-stop flag F2 is kept to be "1" (stop).

Next, the behavior of the starting apparatus drive start request flag F3 will be explained. The starting apparatus drive start request flag F3 is kept to be "1" (request) in the interval from a time instant when the engine restarting condition is satisfied to a time instant when the drive of the starting apparatus 30 is started. In FIG. 9, because at the time instant t92, the automatic stopping condition F1 is "0" (run), the starting apparatus drive start request flag F3 turns to "1" (request); after that, at a time instant t97 at which the drive of the starting apparatus 30 is started and an OCR interruption occurs, the starting apparatus drive start request flag F3 turns to "0" (non-request).

Next, the behavior of fuel injection will be explained. When the idling stop condition is satisfied, fuel injection is prohibited, and when the idling stop release condition (engine restarting condition) is satisfied, fuel injection is permitted and hence fuel injection is restarted. In FIG. 9, when at the time instant t92, the automatic stopping condition F1 turns to "0" (run), the fuel injection flag turns to "1" (permission of fuel injection).

At last, the behaviors of drive stopping and drive starting of the starting apparatus 30 by use of the OCR function will be explained. The OCR function operates in synchronization with an input timing of the crank pulse signal; when the starting apparatus drive start request flag F3 is "1" (request), the engine rotation speed is larger than the starting apparatus drive starting threshold value N1, and the engine rotation speed is decreasing, the OCR function is enabled so as to set the drive start timing of the starting apparatus 30.

In FIG. 9, at the time instant t93, because the starting apparatus drive start request flag F3 is "1" (request), the engine rotation speed is larger than the starting apparatus drive starting threshold value N1, and the present engine rotation speed NE1 is smaller than the immediately previous engine rotation speed NE2, the OCR function is set.

That is to say, at first, From the present engine rotation speed NE1 at the time instant t93, the immediately previous engine rotation speed NE2 at the time instant t91, and the crank pulse signal input period Tint from the time instant t91 to the time instant t93, the gradient NEgrad(1) in the engine rotation speed in the time interval from the time instant t91 to the time instant t93 is calculated based on the equation [(NE1−NE2)÷Tint].

Next, it is estimated that after the time instant t93, the engine rotation speed decreases with a gradient the same as that at and before the time instant t93; then, from the present engine rotation speed NE1 at the time instant t93, the gradient NEgrad(1) in the engine rotation speed, and the starting apparatus drive starting threshold value N1, a starting apparatus drive start waiting time Twait(1) in which the engine rotation speed reaches the starting apparatus drive starting threshold value N1 is calculated based on the equation [(N1−NE1)÷NEgrad(1)]. The result of the calculation suggests that a time instant t98 that is obtained by adding the starting apparatus drive start waiting time Twait (1) to the time instant t93 is an optimum timing (1) for starting the drive of the starting apparatus 30.

Subsequently, the value obtained by adding the starting apparatus drive start waiting time Twait(1) to the value of the FRC 101 at the time instant t93 is set in the OCR 103 so that setting for starting the drive of the starting apparatus 30 when an OCR interruption occurs is implemented; then, the OCR function is enabled [effective: 1] so that the OCR interruption is permitted [permission: 1].

Next, at the time instant t94, because the present engine rotation speed NE1 becomes the same as or larger than the immediately previous engine rotation speed NE2, the OCR function is negated (ineffective: 0) so that OCR interruption is prohibited (prohibition: 0).

Next, at the time instant t95, because the starting apparatus drive start request flag F3 is "1" (request), the engine rotation speed is larger than the starting apparatus drive starting threshold value N1, and the present engine rotation speed NE1 is smaller than the immediately previous engine rotation speed NE2, the OCR function is enabled [effective: 1].

At first, From the present engine rotation speed NE1 at the time instant t95, the immediately previous engine rotation speed NE2 at the time instant t94, and the crank pulse signal input period Tint from the time instant t94 to the time instant t95, the gradient NEgrad(2) in the engine rotation speed in the time interval from the time instant t94 to the time instant t95 is calculated based on the equation [(NE1−NE2)÷Tint].

Next, it is estimated that after the time instant t95, the engine rotation speed decreases with a gradient the same as that at and before the time instant t95; then, from the present engine rotation speed NE1 at the time instant t95, the gradient NEgrad(2) in the engine rotation speed, and the starting apparatus drive starting threshold value N1, a starting apparatus drive start waiting time Twait(2) in which the engine rotation speed reaches the starting apparatus drive starting threshold value N1 is calculated based on the equation [(N1−NE1)÷NEgrad(2)]. The result of the calculation suggests that a time instant t100 that is obtained by adding the starting apparatus drive start waiting time Twait (2) to the time instant t95 is an optimum timing (2) for starting the drive of the starting apparatus 30.

Subsequently, the value obtained by adding the starting apparatus drive start waiting time Twait (2) to the value of the FRC 101 at the time instant t95 is set in the OCR 103 so that setting for starting the drive of the starting apparatus 30 when an OCR interruption occurs is implemented; then, the OCR function is enabled [effective: 1] so that the OCR interruption is permitted [permission: 1].

Next, at the time instant t96, because the starting apparatus drive start request flag F3 is "1" (request), the engine rotation speed is larger than the starting apparatus drive starting threshold value N1, and the present engine rotation speed NE1 is smaller than the immediately previous engine rotation speed NE2, the OCR function is set.

That is to say, at first, From the present engine rotation speed NE1 at the time instant t96, the immediately previous engine rotation speed NE2 at the time instant t95, and the crank pulse signal input period Tint from the time instant t95 to the time instant t96, a gradient NEgrad(3) of the engine rotation speed in the time interval from the time instant t95 to the time instant t96 is calculated based on the equation [(NE1−NE2)÷Tint].

Next, it is estimated that after the time instant t96, the engine rotation speed decreases with a gradient the same as that at and before the time instant t96; then, from the present engine rotation speed NE1 at the time instant t96, the gradient NEgrad in the engine rotation speed, and the starting apparatus drive starting threshold value N1, the starting apparatus drive start waiting time Twait (3) in which the engine rotation speed reaches the starting apparatus drive starting threshold value N1 is calculated based on the equation[(N1−NE1)÷NEgrad(3)]. The result of the calculation suggests that the time instant t97 that is obtained by adding the starting apparatus drive start waiting time Twait (3) to the time instant t96 is an optimum timing (3) for starting the drive of the starting apparatus 30.

Subsequently, a value obtained by adding the starting apparatus drive start waiting time Twait(3) to the value of the FRC 101 at the time instant t96 is set in the OCR 103.

Because at the time instant t97, the value of the FRC 101 coincides with the value of the OCR 103, an OCR interruption occurs and hence the drive of the starting apparatus 30 is started.

Simultaneously, at the time instant t97, the OCR interruption processing is activated; the starting apparatus drive start request flag F3 turns to "0" (non-request); the OCR function is negated (negation: 0); then, the OCR interruption is prohibited (prohibition: 0).

As described above, in the engine automatic-stop/restart system and the engine automatic-stop/restart method according to Embodiment 1 of the present invention, when the engine restarting condition is satisfied and the starting apparatus drive start request is issued, the crank pulse input interruption processing unit 13 calculates an optimum drive start timing of the starting apparatus 30 in accordance with the newest information on the engine rotation speed; thus, interruption upper processing does not provide any effect and hence the drive of the starting apparatus 30 can be started at an optimum timing.

Accordingly, the sound produced by engagement between the pinion gear 35 and the ring gear 22 is suppressed, and no excessively large load is imposed on either the pinion gear 35 or the ring gear 22; concurrently, the processing load on the CPU 104 can be reduced.

The engine automatic-stop/restart system, described heretofore, according to Embodiment 1 of the present invention includes the following inventions.

1. An engine automatic-stop/restart system that stops fuel injection into an engine so as to stop the engine when an engine automatic stopping condition is satisfied and then restarts the engine when an engine restarting condition is satisfied, the engine automatic-stop/restart system comprising:

a crank angle sensor that outputs a crank pulse signal in accordance with a crank angle of a crankshaft of the engine;

a starting apparatus that cranks the crankshaft so as to restart the engine;

a starting apparatus drive start waiting time calculation unit that calculates, while the engine is inertially rotating, a starting apparatus drive start waiting time in which an engine rotation speed becomes the same as or lower than a predetermined threshold value, based on a gradient of a change in the engine rotation speed and the engine rotation speed detected on the basis of an output of the crank angle sensor; and a starting apparatus drive start setting unit that sets in an output comparison register provided in an microcomputer a starting apparatus drive starting time instant obtained by adding the calculated starting apparatus drive start waiting time to a present time instant read from a free-running counter provided in the microcomputer and that starts drive of the starting apparatus by use of an output comparison register function, of the microcomputer, that generates an output when the set starting apparatus drive starting time instant and the value of the free-running counter coincide with each other.

2. The engine automatic-stop/restart system according to 1, wherein based on an immediately previous engine rotation speed obtained from an input time instant of the twice previous crank pulse signal from the crank angle sensor and an input time instant of the immediately previous crank pulse signal, the present engine rotation speed obtained from the input time instant of the immediately previous crank pulse signal and the input time instant of the present crank pulse signal, and the time interval from the input time instant of the immediately previous crank pulse signal to the input time instant of the present crank pulse signal, the starting apparatus drive start waiting time calculation unit calculates a gradient of a change in the engine rotation speed; and wherein in the case where the calculated gradient of a change in the engine rotation speed is decreasing and the present engine rotation speed is higher than the predetermined threshold value, the starting apparatus drive start waiting time calculation unit calculates the starting apparatus drive start waiting time, based on the present engine rotation speed, the predetermined threshold value, and the gradient of a change in the engine rotation speed.

3. The engine automatic-stop/restart system according to 2, wherein letting NE, N1, and NEgrad denote the present engine rotation speed, the predetermined threshold value, and the gradient of a change in the engine rotation speed, respectively, the starting apparatus drive start waiting time calculation unit calculates the starting apparatus drive start waiting time, based on an equation [(N1−NE)÷NEgrad].

4. The engine automatic-stop/restart system according to any one of 1 through 3, wherein letting NE2 and NE1 denote an immediately previous engine rotation speed calculated when an immediately previous crank pulse signal is inputted and the present engine rotation speed calculated when the present crank pulse signal is inputted, respectively, the starting apparatus drive start setting unit negates the output comparison register function of the microcomputer in the case where [NE1≥NE2] is satisfied after enabling the output comparison register function of the microcomputer.

5. An engine automatic-stop/restart method that stops fuel injection into an engine so as to stop the engine when an engine automatic stopping condition is satisfied and then restarts the engine when an engine restarting condition is satisfied, wherein while the engine is inertially rotating, a starting apparatus drive start waiting time in which a rotation speed of the engine becomes lower than a predetermined threshold value is calculated based on the engine rotation speed and a gradient of a change in the engine rotation speed; a starting apparatus drive starting time instant is set by adding the calculated starting apparatus drive start waiting time to a present time instant; then, when the present time instant coincides with the set starting apparatus drive starting time instant, drive of the starting apparatus is started.

In the scope of the present invention, the embodiments thereof can appropriately be modified or omitted.

INDUSTRIAL APPLICABILITY

The present invention can be applied to the industry of an automobile equipped with an engine automatic-stop/restart system that automatically stops the engine when a predetermined engine automatic stopping condition is satisfied and then restarts the engine when an engine restarting condition is satisfied.

DESCRIPTION OF REFERENCE NUMERALS

1: crank angle sensor
2: vehicle speed sensor
3: accelerator opening degree sensor
4: brake unit
10: engine control unit
20: engine
30: starting apparatus
21: fuel injection unit
22: ring gear
31: solenoid
32: plunger
33: lever
34: starter motor
35: pinion gear
12: engine automatic-stop control unit
13: crank pulse input interruption processing unit
16: OCR interruption processing unit
14: starting apparatus drive start waiting time calculation unit
15: starting apparatus drive start setting unit
101: free-running counter (FRC)
102: comparator
103: output comparison register (OCR)
104: computing processing unit (CPU)
105: ROM
106: RAM
107: bus
108: input/output interface (I/O)

The invention claimed is:

1. An engine automatic-stop/restart system that stops fuel injection into an engine so as to stop the engine when an engine automatic stopping condition is satisfied and then restarts the engine when an engine restarting condition is satisfied, the engine automatic-stop/restart system comprising:

a crank angle sensor that outputs a crank pulse signal in accordance with a crank angle of a crankshaft of the engine;

a starter that cranks the crankshaft so as to restart the engine; and a microcomputer configured to implement:

a starter drive start waiting time calculation unit that calculates, while the engine is inertially rotating and a gradient of a change in an engine rotation speed is decreasing and the present engine rotation speed is higher than a predetermined threshold value, whenever the output of the crank angle sensor was inputted, a starter drive start waiting time in which the engine rotation speed becomes the same as or lower than a predetermined threshold value, based on the gradient of a change in the engine rotation speed and the engine rotation speed detected on the basis of an output of the crank angle sensor; and a starter drive start setting unit that sets, in an output comparison register provided in the microcomputer, a starter drive starting time instant obtained by adding the calculated starter drive start waiting time to a present time instant read from a free-running counter provided in the microcomputer and that starts driving of the starter by use of an output comparison register function, of the microcomputer, that generates an output when the set starter drive starting time instant and the value of the free-running counter coincide with each other, wherein letting NE2 and NE1 denote an immediately previous engine rotation speed calculated when an immediately previous crank pulse signal is inputted and the present engine rotation speed calculated when the present crank pulse signal is inputted, respectively, the starter drive start setting unit disenables the output comparison register function of the microcomputer in the case where [NE1≥NE2] is satisfied, and the starter drive start setting unit enables the output comparison register function of the microcomputer again in the case where [NE2≥NE1] is satisfied after disenabling the output comparison register function of the microcomputer, and wherein the predetermined threshold value is between 100 revolutions per min (RPM) and 230 RPM.

2. The engine automatic-stop/restart system according to claim 1, wherein based on an immediately previous engine rotation speed obtained from an input time instant of the twice previous crank pulse signal from the crank angle sensor and an input time instant of the immediately previous crank pulse signal, the present engine rotation speed obtained from the input time instant of the immediately previous crank pulse signal and the input time instant of the present crank pulse signal, and the time interval from the input time instant of the immediately previous crank pulse signal to the input time instant of the present crank pulse signal, the starter drive start waiting time calculation unit calculates a gradient of a change in the engine rotation speed; and wherein in the case where the calculated gradient of the change in the engine rotation speed is decreasing and the present engine rotation speed is higher than the predetermined threshold value, the starter drive start waiting time calculation unit calculates the starter drive start waiting time, based on the present engine rotation speed, the predetermined threshold value, and the gradient of a change in the engine rotation speed.

3. The engine automatic-stop/restart system according to claim 2, wherein letting NE, N1, and NEgrad denote the present engine rotation speed, the predetermined threshold value, and the gradient of a change in the engine rotation speed, respectively, the starter drive start waiting time calculation unit calculates the starter drive start waiting time, based on an equation [(N1−NE)÷NEgrad].

4. An engine automatic-stop/restart method that stops fuel injection into an engine so as to stop the engine when an engine automatic stopping condition is satisfied and then restarts the engine when an engine restarting condition is satisfied, wherein while the engine is inertially rotating and a gradient of a change in an engine rotation speed is decreasing and the present engine rotation speed is higher than a predetermined threshold value, whenever the output of the crank angle sensor was inputted, a starter drive start waiting time in which the rotation speed of the engine becomes lower than the predetermined threshold value is calculated based on the engine rotation speed and a gradient of a change in the engine rotation speed detected on the basis of an output of the crank angle sensor; a starter drive starting time instant is set by adding the calculated starter drive start waiting time to a present time instant read from a free-running counter; then, when the value of the free-running counter coincides with the set starter drive starting time instant, driving of the starter is started, and wherein letting NE2 and NE1 denote an immediately previous engine rotation speed calculated when an immediately previous crank pulse signal is inputted and the present engine rotation speed calculated when the present crank pulse signal is inputted, respectively, the output comparison register function of the microcomputer is disenabled in the case where [NE1≥NE2] is satisfied, and the output comparison register function of the microcomputer is enabled again in the case where [NE2≥NE1] is satisfied after disenabling the output comparison register function of the microcomputer, and wherein the predetermined threshold value is between 100 revolutions per min (RPM) and 230 RPM.

* * * * *